(12) United States Patent
Ukisu et al.

(10) Patent No.: US 11,458,633 B2
(45) Date of Patent: Oct. 4, 2022

(54) ARTICLE TRANSFER APPARATUS (71) Applicant: Daifuku Co., Ltd., Osaka (JP)

(72) Inventors: Kenichi Ukisu, Tokyo (JP); Atsushi Kurayama, Tokyo (JP); Sadataka Nishihara, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 210 days.

(21) Appl. No.: 16/795,781

(22) Filed: Feb. 20, 2020

(65) Prior Publication Data
US 2020/0269428 A1  Aug. 27, 2020

(30) Foreign Application Priority Data

Feb. 26, 2019 (JP) ............................. JP2019-032834

(51) Int. Cl.
*B25J 9/16* (2006.01)
*B25J 19/02* (2006.01)

(52) U.S. Cl.
CPC ............ *B25J 9/1687* (2013.01); *B25J 9/1697* (2013.01); *B25J 19/023* (2013.01)

(58) Field of Classification Search
CPC ........... G05B 2219/45063; G05B 2219/40053; G05B 2219/39571; B65G 61/00; B65G 60/00; B65G 47/915; B65G 47/917; B25J 19/021; B25J 19/023; B25J 13/08; B25J 9/1697; B25J 9/1687; B25J 9/1664
See application file for complete search history.

(56) References Cited

U.S. PATENT DOCUMENTS

| | | | |
|---|---|---|---|
| 2014/0121836 A1* | 5/2014 | Ban | B25J 9/0093 700/259 |
| 2014/0316573 A1* | 10/2014 | Iwatake | B25J 9/1697 700/258 |
| 2018/0065818 A1 | 3/2018 | Gondoh et al. | |
| 2018/0333857 A1* | 11/2018 | Ando | B25J 13/088 |
| 2019/0177095 A1* | 6/2019 | Ukisu | G05B 19/418 |

FOREIGN PATENT DOCUMENTS

| | | |
|---|---|---|
| JP | 2001315079 A | 11/2001 |
| JP | 201450936 A | 3/2014 |
| JP | 201839613 A | 3/2018 |
| WO | WO-2018201244 A1 * 11/2018 ........... B25J 15/0004 |

* cited by examiner

*Primary Examiner* — Abby Y Lin
*Assistant Examiner* — Dylan Brandon Mooney
(74) *Attorney, Agent, or Firm* — The Webb Law Firm (57) ABSTRACT

An article transfer apparatus includes a holding portion, a driving portion that moves the holding portion, a control unit, and a reference detection portion that detects a reference position of a target article held by the holding portion. The control unit performs reference detection control to detect, by the reference detection portion, the reference position in a state in which the target article is lifted, determination control to determine a positional relationship between the holding portion and the reference position based on a result of detection by the reference detection control, and position calculation control to calculate, based on the positional relationship determined by the determination control, a movement destination position that is a position, of the holding portion at the movement destination, at which an outer edge of the target article held by the holding portion fits within a movement region.

5 Claims, 10 Drawing Sheets

ARTICLE TRANSFER APPARATUS

CROSS-REFERENCE TO RELATED APPLICATION

This application claims priority to Japanese Patent Application No. 2019-032834 filed Feb. 26, 2019, the disclosure of which is hereby incorporated by reference in its entirety.

BACKGROUND OF THE INVENTION

1. Field of the Invention

The present invention relates to an article transfer apparatus including a holding portion that holds a target article, a driving portion that moves the holding portion, and a control unit that controls the holding portion and the driving portion.

2. Description of the Related Art

As such an article transfer apparatus, an article transfer apparatus described in JP 2018-039613A (Patent Document 1) is known, for example. In the following, the reference numerals or terms in parentheses in "Description of the Related Art" are those described in the related art document. When transferring a target article from a movement origin (second container C2) to a movement destination (first container C1), the article transfer apparatus described in Patent Document 1 holds the target article (WT) located at the movement origin (second position P2), thereafter moves the target article to a set position at the movement destination (first position P1), and then releases the hold of the target article.

The above-described article transfer apparatus includes an image capturing device (second image capturing device 9) that captures an image of the movement origin. The control unit determines the position of the target article at the movement origin based on the image capture information obtained by the image capturing device, and controls the holding portion and the driving portion so as to hold the determined target article and move the target article to the movement destination. When the target article is moved to the movement destination in this manner, it is desirable to move the target article to the movement destination such that the outer edge of the target article fits within a movement region (e.g., in a container) set for the movement destination. Also, when the target article is moved, it is conceivable to set, for example, the gravity center position of the target article or a position of the target article that can be easily held, as a reference holding position, and to move the target article so as to hold the reference holding position, thus moving the target article to the movement destination while holding the target article appropriately.

However, depending on the housing state of the target article at the movement origin, or the color or shape of the external appearance of the target article, including, for example, the presence of a transparent portion on the target article, it is difficult to detect the outer edge or the like of the article, and therefore, the position of the target article located at the movement origin may not be accurately recognized. Accordingly, when the reference holding position of the target article is to be held by the holding portion, a position of the target article that is displaced from the reference holding position may be held by the holding portion. When the target article is moved to the movement destination in a state in which the position thereof displaced from the reference holding position is held, the outer edge of the target article may not fit within the movement region. In such a case, for example, if a container is set at the movement destination, and a bottom portion of that container is the movement region, it may not be possible to appropriately house the target article inside the container as a result of, for example, the target article coming into contact with a side wall portion of the container.

Therefore, there is demand for an article transfer apparatus that can appropriately move the target article into the movement region of the movement destination even if the holding position of the target article by the holding portion is displaced from the holding position serving as a reference.

SUMMARY OF THE INVENTION

An article transfer apparatus according to the present disclosure includes a holding portion that holds a target article; a driving portion that moves the holding portion; and a control unit that controls the holding portion and the driving portion, wherein the control unit performs hold control to hold the target article located at a movement origin, movement control to move the target article held by the holding portion into a movement region of a movement destination, and hold-release control to release hold of the target article located inside the movement region, the article transfer apparatus further includes a reference detection portion that detects a reference position of the target article held by the holding portion, the control unit further performs reference detection control to detect, by the reference detection portion, the reference position in a state in which the target article is lifted from the movement origin, determination control to determine a positional relationship between the holding portion and the reference position based on a result of detection by the reference detection control, and position calculation control to calculate, based on the positional relationship determined by the determination control, a movement destination position that is a position, of the holding portion at the movement destination, at which an outer edge of the target article held by the holding portion fits within the movement region, and the control unit controls the driving portion so as to move the holding portion to the movement destination position in the movement control.

With this configuration, the reference position is detected by the reference detection portion in a state in which the target article is lifted from the movement origin. By detecting the reference position in a state in which the target article is lifted from the movement origin in this manner, the reference position can be detected under less influence or no influence from another article or the like located at the movement origin, as compared with when the reference position is detected in a state in which the target article is located at the movement origin. Accordingly, the accuracy of detection of the reference position of the target article can be increased, and the accuracy of determination of the positional relationship between the holding portion and the reference position, which is determined based on a result of the aforementioned detection, can also be increased.

By performing the position calculation control based on the determined positional relationship between the holding portion and the reference position, it is possible to obtain an appropriate movement destination position of the holding portion according to the positional relationship between the holding portion and the reference position in a state in which the target article is held. By moving the holding portion to a movement destination position obtained in this manner, the target article can be moved to the movement destination such that the outer edge of the target article fits within the movement region. That is, even if the positional relationship between the holding portion and the reference position is not a proper positional relationship as a result of the holding position of the target article by the holding portion being displaced from the holding position serving as a reference, it is possible to obtain an appropriate movement destination position of the holding portion according to that positional relationship. Therefore, by moving the holding portion to the obtained movement destination position, the target article can be moved such that the outer edge of the target article fits within the movement region. Thus, with the present configuration, even if the holding position of the target article by the holding portion is displaced from the holding position serving as a reference, the target article can be appropriately moved into the movement region of the movement destination.

DESCRIPTION OF THE INVENTION

1. Embodiment

Figure 1:
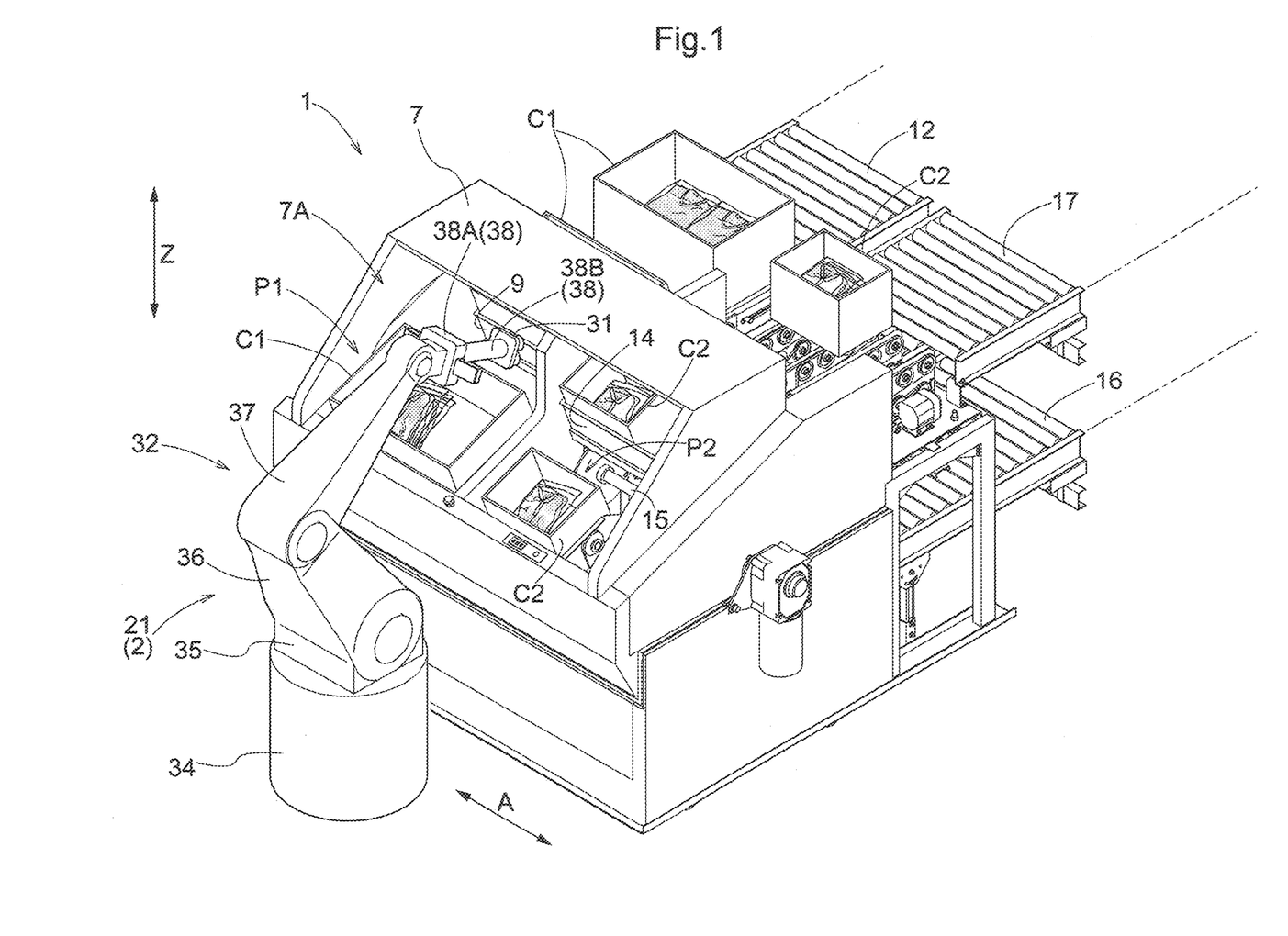
FIG. 1 is a perspective view of relevant portions of an article transport facility.

An embodiment of an article transfer apparatus will be described with reference to the drawings. Here, a description will be given of a case where an article transfer apparatus according to the present embodiment is provided in an article transport facility. As shown in FIG. 1, the article transport facility includes a container transport apparatus 1 that transports first containers C1 and second containers C2, and an article transfer apparatus 2 that transfers an article W from a first container C1 located at a movement origin P1 to a second container C2 located at a movement destination P2. In the present embodiment, a carousel-type transport apparatus is provided as the container transport apparatus 1.

Container

As shown in FIGS. 7 to 14, each first container C1 includes a rectangular bottom portion 3 that supports the article W from below, and a side wall portion 4 standing upright from four sides that form an outer edge of the bottom portion 3, and the first container C1 is formed in a box shape that is open upward. As in the case of the first container C1, each second container C2 includes a bottom portion 3 and a side wall portion 4, and is formed in a box shape that is open upward. In the present embodiment, a foldable container is used as the first container C1, and a container made of paper, such as a corrugated cardboard box, is used as the second container C2.

Container Transport Apparatus

Figure 2:
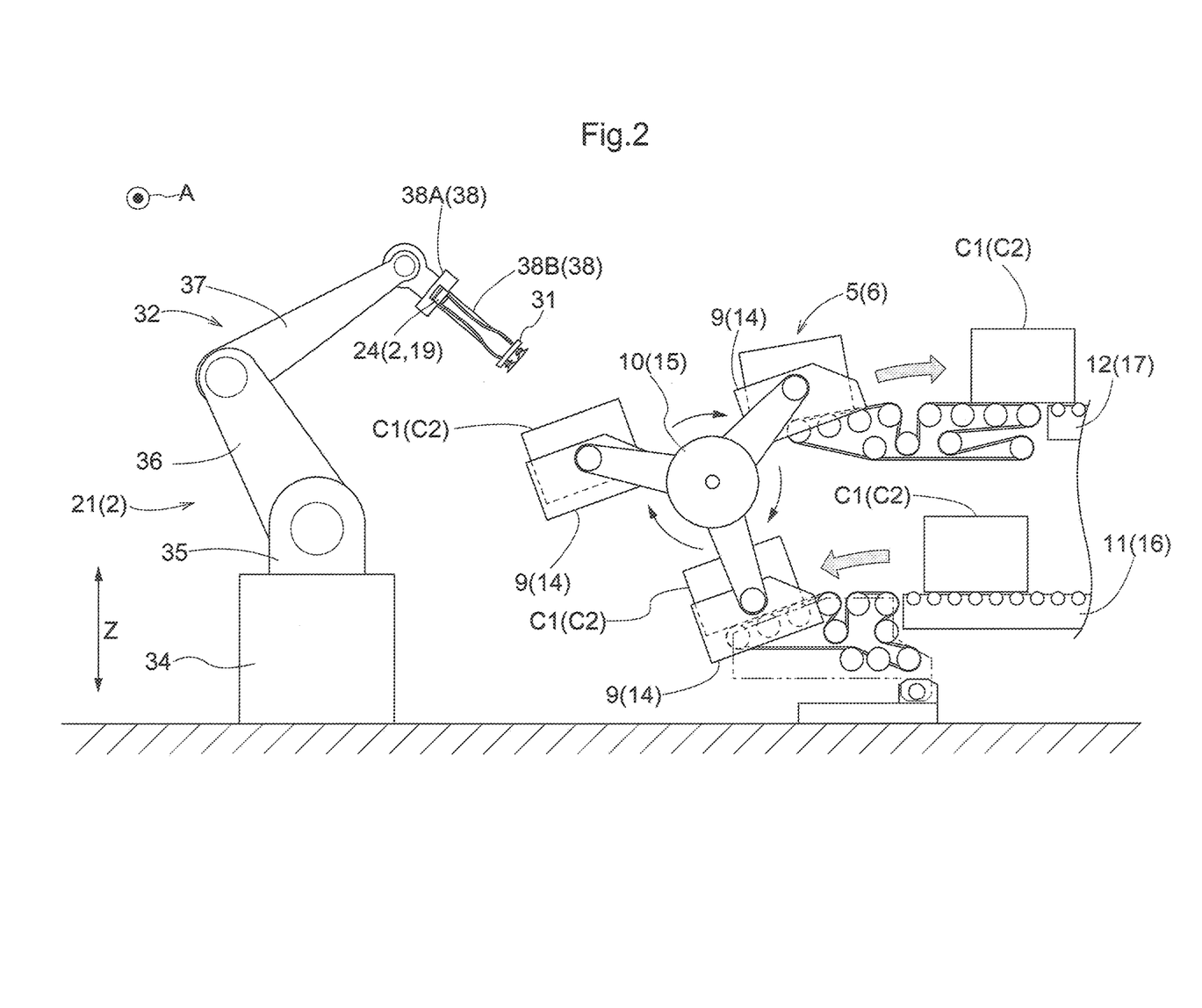
FIG. 2 is a schematic diagram showing a transport structure of a container transport apparatus.

As shown in FIGS. 1 and 2, the container transport apparatus 1 includes a first transport portion 5 that transports the first container C1, a second transport portion 6 that transports the second container C2, and a framework case 7 that stores at least a portion of the first transport portion 5 and the second transport portion 6. The first transport portion 5 and the second transport portion 6 are installed so as to be arranged in an arrangement direction A extending along the horizontal direction.

As shown in FIG. 2, the first transport portion 5 includes a plurality of first support members 9 that support the first container C1, a first rotary body 10 that rotates the plurality of first support members 9 about an axis extending along the arrangement direction A, a first upstream conveyor 11, and a first downstream conveyor 12. When transporting the first container C1, the first transport portion 5 passes the first container C1 from the first upstream conveyor 11 to the first support member 9, rotates and transports the first container C1 by rotating the first rotary body 10 so as to rotate the first container C1 about the axis extending along the arrangement direction A, and thereafter passes the first container C1 from the first support member 9 to the first downstream conveyor 12. The position of the movement origin P1 is set at a position midway in a rotation-transport path of the first transport portion 5.

The second transport portion 6 includes a plurality of second support members 14 that support the second container C2, a second rotary body 15 that rotates the plurality of second support members 14 about an axis extending along the arrangement direction A, a second upstream conveyor 16, and a second downstream conveyor 17. When transporting the second container C2, the second transport portion 6 passes the second container C2 from the second upstream conveyor 16 to the second support member 14, rotates and transports the second container C2 by rotating the second rotary body 15 so as to rotate the second container C2 about the axis extending along the arrangement direction A, and thereafter passes the second container C2 from the second support member 14 to the second downstream conveyor 17. The position of the movement destination P2 is set at a position midway in a rotation-transport path of the second transport portion 6. Note that a second container C2 that is supported by the second support member 14 at the movement destination P2 corresponds to a box-shaped housing portion installed at the movement destination P2.

As shown in FIG. 1, the plurality of first support members 9, the first rotary body 10, the plurality of second support members 14, and the second rotary body 15 are stored in the framework case 7. The first upstream conveyor 11, the first downstream conveyor 12, the second upstream conveyor 16, and the second downstream conveyor 17 are installed so as to extend between the inside and the outside of the framework case 7. The framework case 7 is provided with an opening 7A above the movement origin P1 and the movement destination P2. Via the opening 7A of the framework case 7, the article transfer apparatus 2 can make access to a first container C1 that is supported by the first support member 9 at the movement origin P1, and a second container C2 that is supported by the second support member 14 at the movement destination P2.

Article Transfer Apparatus

Figure 5:
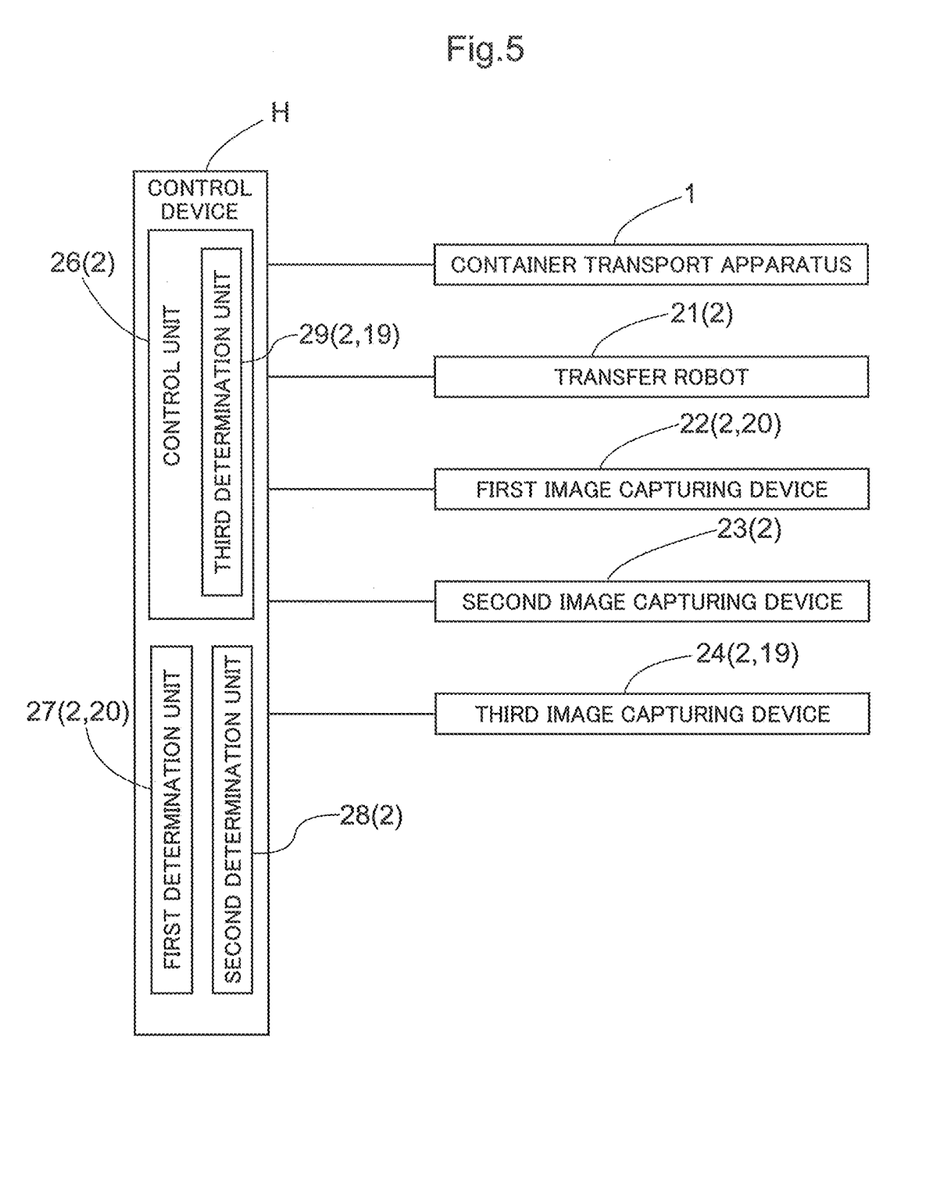
FIG. 5 is a control block diagram.

As shown in FIG. 5, the article transfer apparatus 2 includes a transfer robot 21 that transfers a target article WT from the first container C1 located at the movement origin P1 to the second container C2 located at the movement destination P2, a first image capturing device 22 that captures an image of the inside of the first container C1 located at the movement origin P1, a second image capturing device 23 that captures an image of the inside of the second container C2 located at the movement destination P2, and a third image capturing device 24 that captures an image of the target article WT lifted by the transfer robot 21. Note that an article W that is to be moved from the movement origin P1 to the movement destination P2 by the transfer robot 21 is referred to as a "target article WT". In the present embodiment, a three-dimensional camera is used as each of the first image capturing device 22, the second image capturing device 23, and the third image capturing device 24.

The article transfer apparatus 2 includes a control unit 26 that controls the transfer robot 21 (a holding portion 31 and a driving portion 32), a first determination unit 27 that determines a reference position S of the target article WT housed inside the first container C1, based on image capture information obtained by the first image capturing device 22, a second determination unit 28 that determines whether or not the target article WT is housed inside the second container C2, based on image capture information obtained by the second image capturing device 23, and a third determination unit 29 that determines a reference position S in a state in which the target article WT is lifted from the movement origin P1, based on image capture information obtained by the third image capturing device 24. In the present embodiment, a control device H, which will be described below, includes the functions of the control unit 26, the first determination unit 27, the second determination unit 28, and the third determination unit 29.

The third image capturing device 24 corresponds to a reference image capturing device that captures an image of the target article WT. The third determination unit 29 corresponds to a determination unit that determines the reference position S of the target article WT based on image capture information obtained by the reference image capturing device. A reference detection portion 19 that detects the reference position S of the target article WT held by the holding portion 31 is formed by the third image capturing device 24 and the third determination unit 29. A gravity center detection portion 20 that detects a gravity center position S1 of the target article WT located at the movement origin P1 is formed by the first image capturing device 22 and the first determination unit 27.

Transfer Robot

As shown in FIG. 1, the transfer robot 21 includes a holding portion 31 that holds the article W, and a driving portion 32 that moves the holding portion 31. In the present embodiment, the holding portion 31 includes a plurality of suction pads 31A, and the holding portion 31 is configured to suck and hold the target article WT by causing one, or two or more suction pads 31A to be sucked to the target article WT.

As shown in FIG. 2, the driving portion 32 includes a pedestal portion 34, a rotary portion 35, a first arm 36, a second arm 37, and a third arm 38. The pedestal portion 34 is fixed to a floor, a platform, or the like. The rotary portion 35 is supported by the pedestal portion 34 so as to be rotatable about an axis extending along in a vertical direction Z. A proximal end portion of the first arm 36 is pivotably coupled to the rotary portion 35. A proximal end portion of the second arm 37 is pivotably coupled to a distal end portion of the first arm 36. A proximal end portion of the third arm 38 is pivotably coupled to a distal end portion of the second arm 37. The holding portion 31 is non-pivotably coupled to a distal end portion of the third arm 38. The driving portion 32 moves the holding portion 31 by rotating the rotary portion 35, and causing the first arm 36, the second arm 37, and the third arm 38 to pivot. In this manner, in the present embodiment, the transfer robot 21 is formed by a vertical articulated robot.

The third arm 38 includes a pivot arm portion 38A coupled to the second arm 37, and a rotary arm portion 38B to which the holding portion 31 is coupled. The rotary arm portion 38B is coupled to the pivot arm portion 38A so as to be rotatable about an axis extending along the longitudinal direction of the third arm 38 relative to the pivot arm portion 38A. The third arm 38 is configured to rotate the holding portion 31 about the axis extending along the longitudinal direction of the third arm 38 by rotating the rotary arm portion 38B relative to the pivot arm portion 38A.

The third image capturing device 24 is coupled to the holding portion 31 so as to move together with the holding portion 31. In the present embodiment, the third image capturing device 24 is fixed to the pivot arm portion 38A. Thus, the third image capturing device 24 is configured to also move together with movement of the holding portion 31 caused by the driving portion 32. However, the third image capturing device 24 is configured to not to rotate together with rotation of the holding portion 31. Also, the third image capturing device 24 is installed on either side of the third arm 38 so as to sandwich the third arm 38. That is, the article transfer apparatus 2 includes a pair of the third image capturing devices 24.

Article

Figure 3:
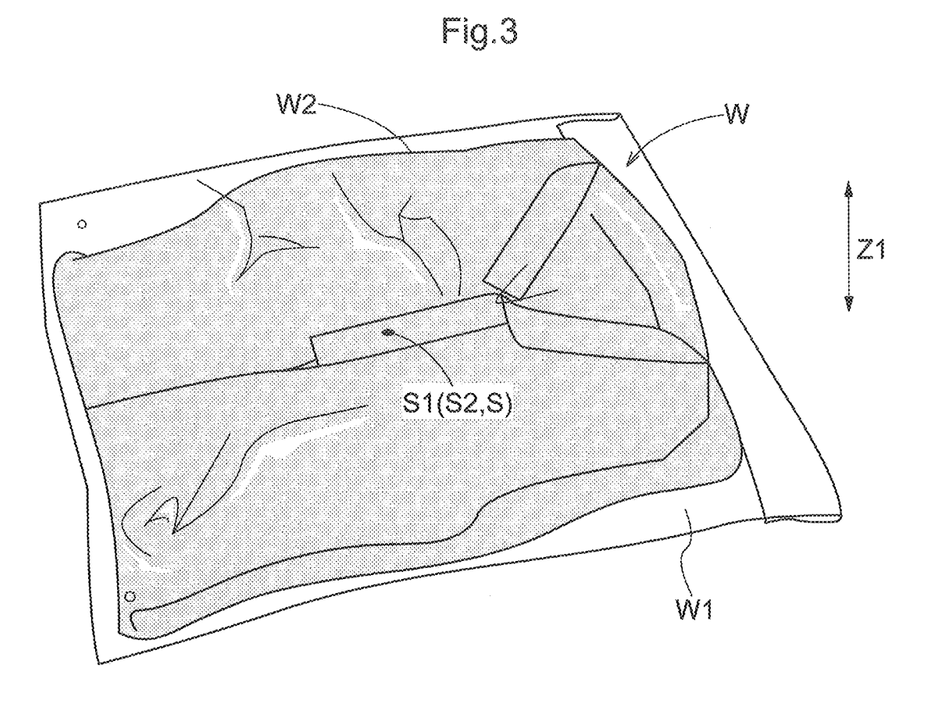
FIG. 3 is a diagram showing an article in which a product is housed in a package.
Figure 4:
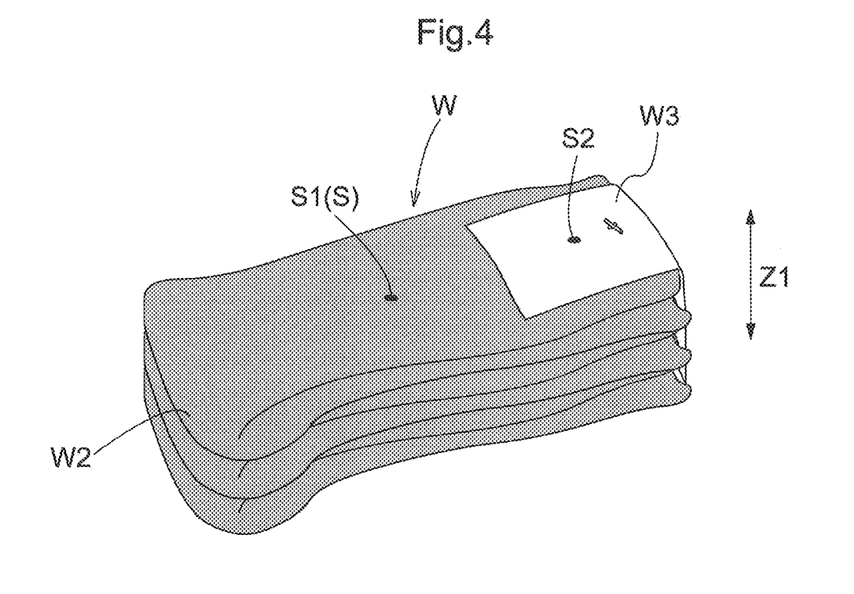
FIG. 4 is a diagram showing an article in which a label is attached to an edge portion of a product.

As shown in FIGS. 3 and 4, articles W include an article (see FIG. 3) in which a product W2 is housed in a package W1, and an article (see FIG. 4) in which a label W3 is attached to an edge portion of a product W2. In the present embodiment, the package W1 may be, for example, a synthetic resin bag having high flexibility, a paper box having low flexibility, or the like. The label W3 may be, for example, a paper sheet having low flexibility or resin sheet, or the like. The product W2 may be other various goods, including, for example, clothing and accessories such as garments, socks, slippers, and sunglasses, and agricultural products and foods such as vegetables and fruits. An article vertical direction Z1 is set for the article W, and the article W is housed in the first container C1 and the second container C2 in an orientation in which the article vertical direction Z1 extends along a container vertical direction Z2. Note that the container vertical direction Z2 is a direction orthogonal to the upper surface of the bottom portions 3 of the first container C1 and the second container C2.

In the present embodiment, a reference position S is set for each of various types of the articles W, and the reference position S of each article W is detected by the reference detection portion 19. Also, in the present embodiment, the position of the gravity center of a plane figure surrounded by an outer edge of the article W is set as the gravity center position S1 in an article vertical direction view, which is a view along the article vertical direction Z1. As shown in FIG. 3, for an article W in which the package W1 is located at the gravity center position S1, and the gravity center position S1 can be sucked and held by the suction pad 31A, such as an article W in which the product W2 is housed in the package W1, the gravity center position S1 is set as a holding position serving as a reference (hereinafter referred to as a "reference holding position S2"). As shown in FIG. 4, for an article W in which the product W2 is located at the gravity center position S1, and the gravity center position S1 cannot be sucked and held by the suction pad 31A, such as an article W in which a label W3 is attached to an edge portion of the product W2, a position (e.g., the label W3) that can be sucked and held by the suction pad 31A, other than the gravity center position S1, is set as the reference holding position S2. In the present embodiment, the gravity center position S1 of the target article WT is set as the reference position S. Accordingly, the reference detection portion 19 detects the gravity center position S1 of the article W as the reference position S. The first determination unit 27 determines the gravity center position S1 of the target article WT housed inside the first container C1 as the reference position S. The second determination unit 28 determines the gravity center position S1 of the target article WT housed inside the second container C2 as the reference position S.

Control Device

The article transport facility includes a control device H that controls the container transport apparatus 1 and the transfer robot 21. Each article W is assigned an identification code that differs according to the type. The identification code and article information are stored in association with each other in the control device H. The article information is information regarding the article W, such as size information indicating the length, width, and height, and weight information indicating the weight. A container code for identifying each first container C1 and an identification code of the article W housed in the first container C1 are stored in association with each other. Holding position information indicating the reference holding position S2 for being held by the holding portion 31 is stored in association with the identification code. As described above, the reference holding position S2 is set at the gravity center position S1 or another suckable position, according to the type of the article W.

The control device H performs first transport control, second transport control, and transfer control. In the first transport control, the first transport portion 5 is controlled so as to transport a first container C1 to the movement origin P1, and, after all target articles WT that are supposed to be taken out from the first container C1 have been taken out, transport the first container C1 from the movement origin P1. In the second transfer control, the second transport portion 6 is controlled so as to transport a second container C2 to the movement destination P2, and, after all target articles WT that are supposed to be housed in the second container C2 have been housed, transport the second container from the movement destination P2. In the transfer control, the transfer robot 21 (the holding portion 31 and the driving portion 32) is controlled so as to take out a target article WT from a first container C1 located at the movement origin P1, and house the target article WT in a second container C2 located at the movement destination P2. By the transfer control, the target article WT is transferred from the first container C1 located at the movement origin P1 to the second container C2 located at the movement destination P2.

Transfer Control

Next, an additional description is given of the transfer control. When performing the transfer control, the control device H performs setting control, hold control, movement control, reference detection control, determination control, position calculation control, hold-release control, and confirmation control.

Figure 7:
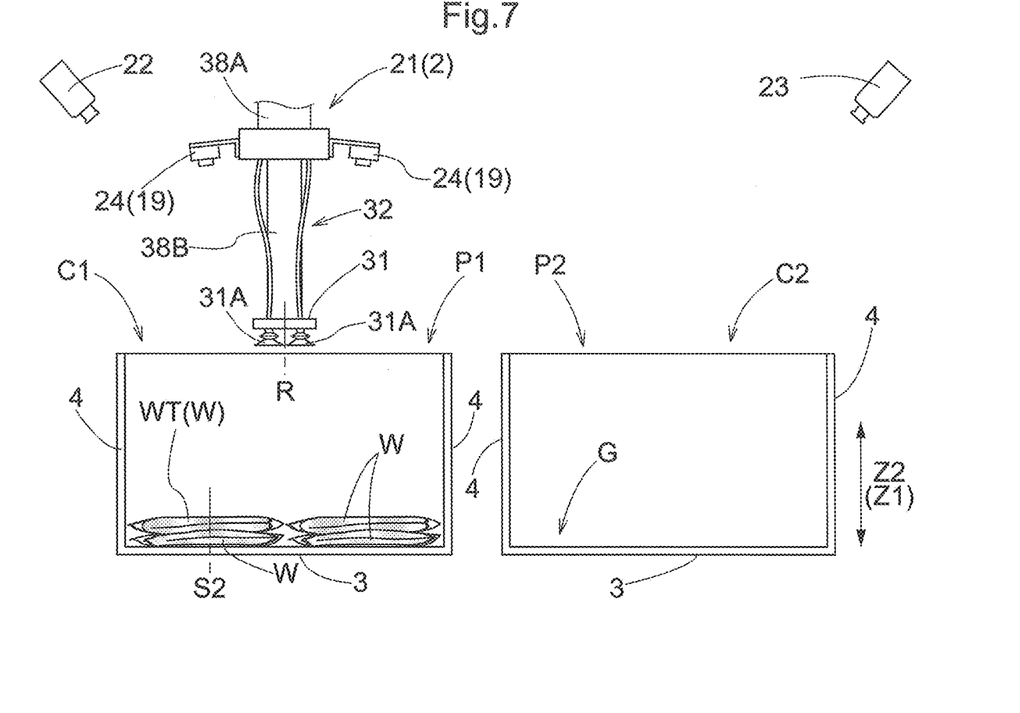
FIG. 7 is a side view showing a state in which setting control is being performed.

The setting control is a control to set the reference holding position S2 for a target article WT housed in a first container C1 located at the movement origin P1. In the present embodiment, as shown in FIG. 7, in the setting control, an image of the inside of a first container C1 located at the movement origin P1 is captured by the first image capturing device 22 in a state in which the holding portion 31 is located outside the first container C1, and the position and the type of each of the articles W housed in the first container C1 located at the movement origin P1 is determined based on the obtained image capture information. Then, one target article WT is selected from one or more articles W housed in the first container C1. Then, according to the type of the selected target article WT, the holding position information stored in association with the identification code of the type of the article is read out, and the reference holding position S2 is set based on the holding position information. Here, if the target article WT is the type of article W for which the gravity center position S1 is set as the reference holding position S2, the outer edge of the target article WT is determined based on the image capture information obtained by the first image capturing device 22. Then, the position serving as the gravity center of a plane figure surrounded by the outer edge is detected as the gravity center position S1, and the detected gravity center position S1 is set as the reference holding position S2. If the selected target article WT is the type of article W for which a suckable position other than the gravity center position S1 is set as the reference holding position S2, the outer edge of the target article WT is determined based on the image capture information obtained by the first image capturing device 22. Then, a position indicated by the holding position information is specified in the region surrounded by the outer edge of the target article WT, and the position is set as the reference holding position S2.

Figure 8:
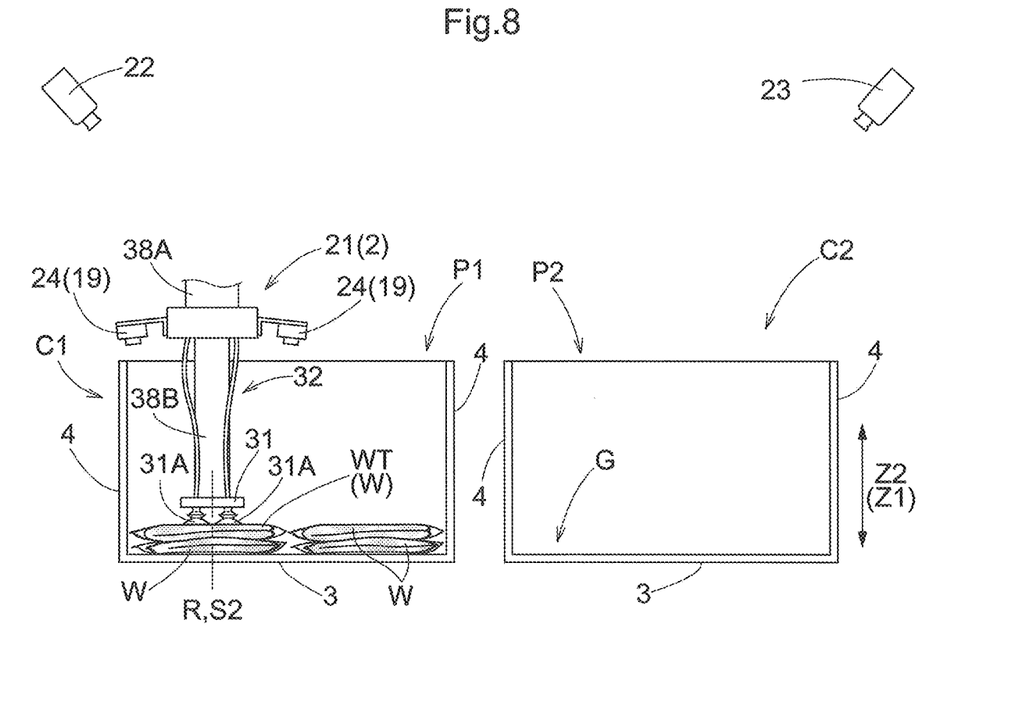
FIG. 8 is a side view showing a state in which hold control has been performed.

As shown in FIG. 8, the hold control is a control to hold a target article WT located at the movement origin P1. In the present embodiment, in the hold control, the holding portion 31 and the driving portion 32 are controlled so as to hold the reference holding position S2 that has been set in the setting control. Specifically, in the hold control, the holding portion 31 and the driving portion 32 are controlled so as to, if the gravity center position S1 is set as the reference holding position S2, hold the gravity center position S1 of the target article WT by the holding portion 31, and, if a suckable position other than the gravity center position S1 is set as the reference holding position S2, hold the suckable position of the target article WT.

Figure 11:
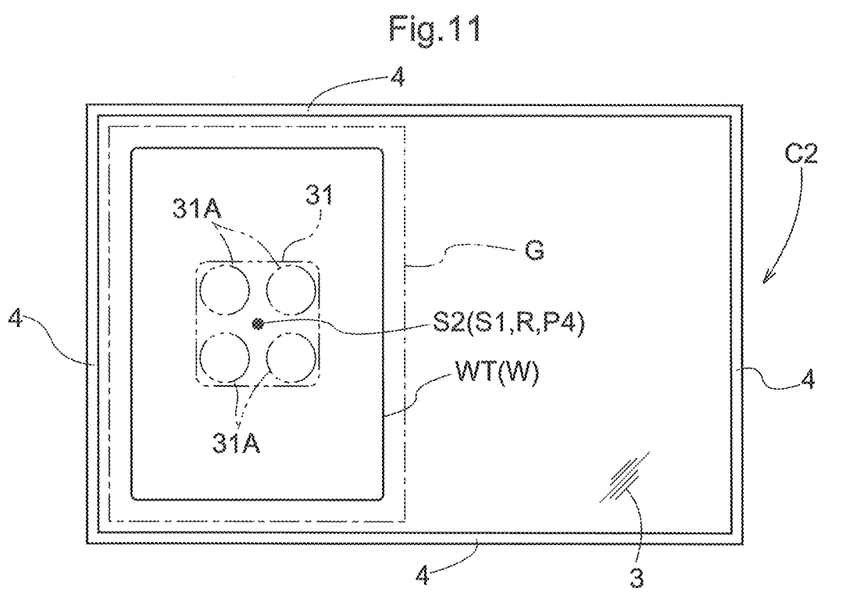
FIG. 11 is an explanatory diagram showing a holding portion at a movement destination position, a reference position of a target article, and a movement region.
Figure 14:
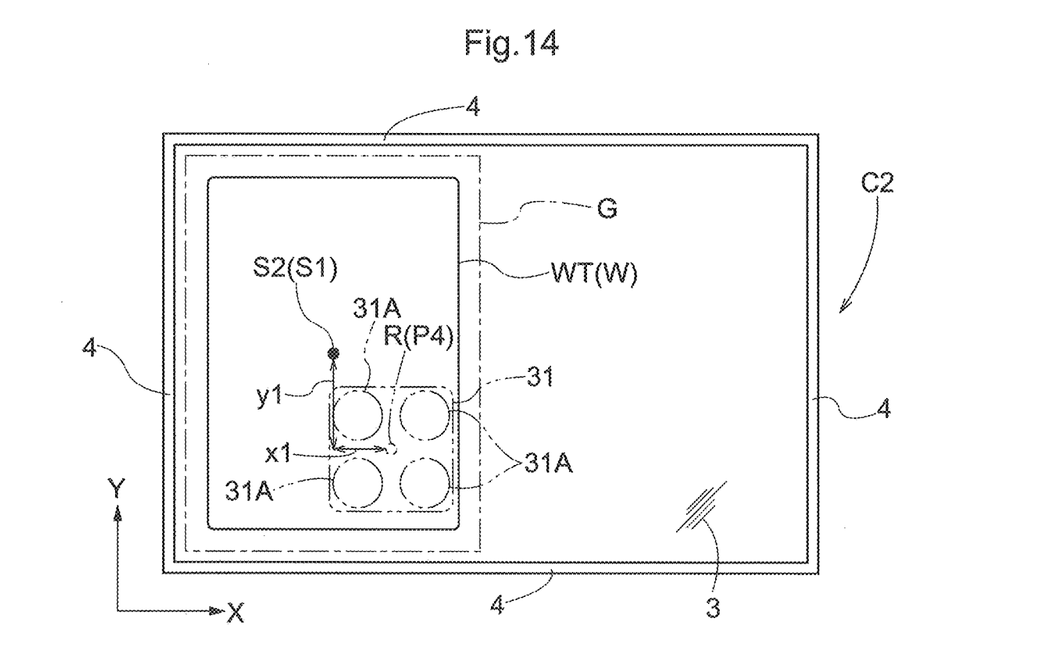
FIG. 14 is an explanatory diagram showing a holding portion at a movement destination position, a reference position of a target article, and a movement region.

In the present embodiment, in the hold control, the holding portion 31 and the driving portion 32 are controlled such that a center position R of the suction pad 31A that holds the target article WT is located at the reference holding position S2 in the article vertical direction view. Assuming that, of the plurality of suction pads 31A of the holding portion 31, one or more suction pads 31A that suck the target article WT are target suction pads, the center position R of the suction pads 31A that hold the target article WT is the position that is located at the center of the one or more target suction pads. Specifically, as shown in FIGS. 11 and 14, when four suction pads 31A are sucked to the target article WT, the position located at the center of the four suction pads 31A is the center position R of the suction pads 31A that hold the target article WT. When only one suction pad 31A is sucked to the target article WT, the position located at the center of that suction pad 31A is the center position R of the suction pad 31A that holds the target article WT. Note that, as will be described below, even if the hold control is performed in this manner, a displacement between the actual holding position (center position R) and the reference holding position S2 by the holding portion 31 may occur due to various factors.

Figure 9:
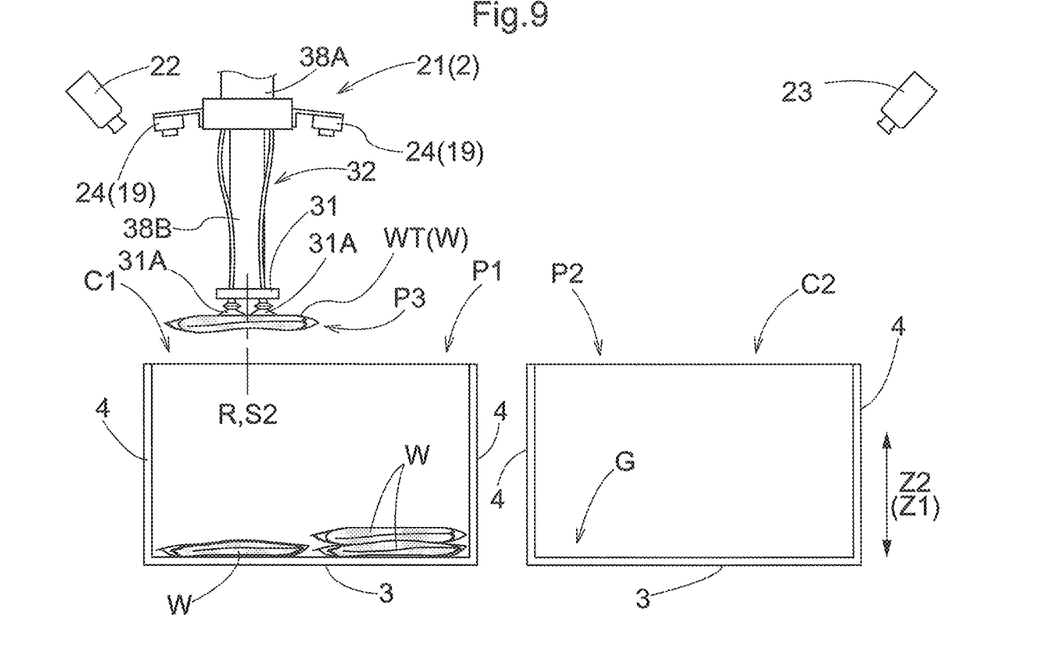
FIG. 9 is a side view showing a state in which first movement control has been performed.
Figure 10:
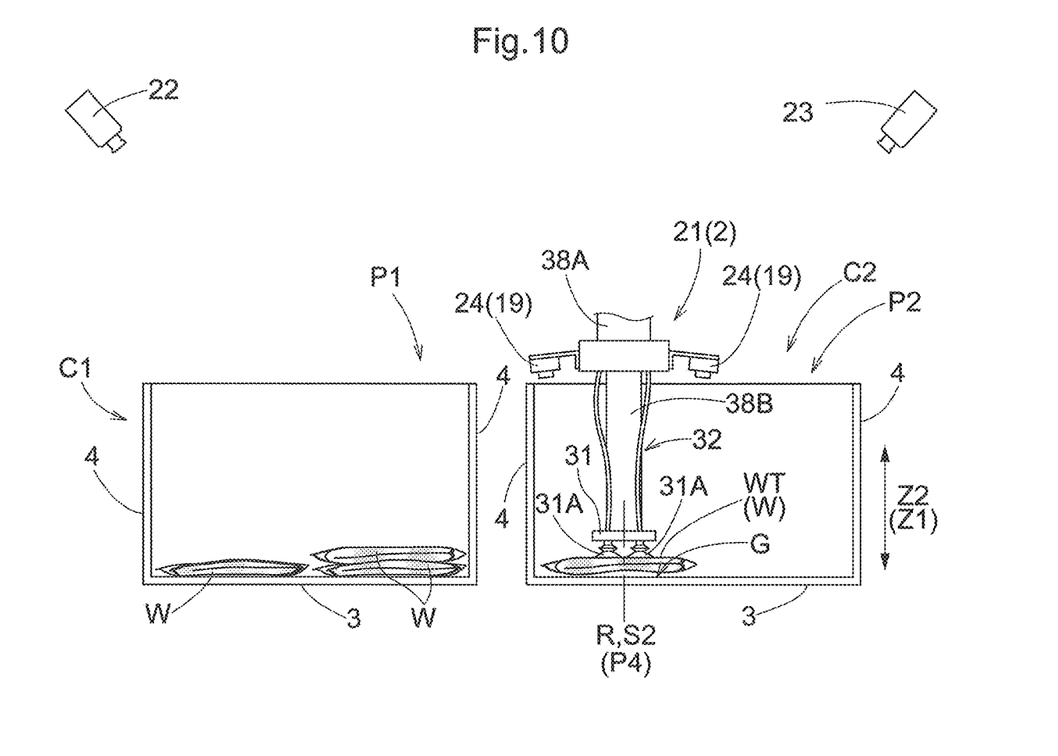
FIG. 10 is a side view showing a state in which second movement control has been performed.

The movement control is a control to move the target article WT held by the holding portion 31 to a movement region G of the movement destination P2 by controlling the driving portion 32 so as to move the holding portion 31 that holds the target article WT to a movement destination position P4 (see FIG. 10). In the present embodiment, in the movement control, first movement control to control the driving portion 32 so as to move the target article WT held by the holding portion 31 from the movement origin P1 to a detection position P3 as shown in FIGS. 8 and 9, and second movement control to control the driving portion 32 so as to move the target article WT from the detection position P3 into the movement region G of the movement destination P2 as shown in FIG. 9 and FIG. 10 are performed. The detection position P3 is a position to which the target article WT is lifted from the movement origin P1, as shown in FIG. 9. In the illustrated example, the detection position P3 is set vertically upward of the first container C1 located at the movement origin P1, and above the upper end of the first container C1. When the movement control is performed, the movement region G to which the target article WT is moved is set on a bottom portion 3 of the second container C2, as shown in FIG. 11. In the second movement control, the driving portion 32 is controlled so as to move the holding portion 31 holding the target article WT to the movement destination position P4 (see FIG. 10). Thus, as shown in FIG. 11, the target article WT held by the holding portion 31 is moved into the movement region G of the movement destination P2. In the present embodiment, the movement region G is set on the bottom portion 3 of the second container C2 located at the movement destination P2.

The reference detection control is a control to detect the reference position S by the reference detection portion 19 in a state in which the target article WT is lifted from the movement origin P1. In the present embodiment, in the reference detection control, as shown in FIG. 9, an image of the target article WT is captured by a pair of third image capturing devices 24 in a state in which the target article WT is located at the detection position P3, and the reference position S of the target article WT is detected based on image capture information obtained by the pair of third image capturing devices 24. In the present embodiment, the reference detection portion 19 detects the gravity center position S1 of the article W (target article WT) as the reference position S in the reference detection control. Specifically, the reference detection portion 19 determines the outer edge of the target article WT based on the image capture information obtained by the third image capturing devices 24, and detects a position serving as the gravity center of a plane figure surrounded by the outer edge as the gravity center position S1. Then, the reference detection portion 19 sets the detected gravity center position S1 as the reference position S.

The determination control is a control to determine the positional relationship between the holding portion 31 and the reference position S based on a result of detection by the reference detection control. In the present embodiment, in the determination control, the positional relationship between the center position R of the suction pad 31A and the reference position S of the target article WT in a direction orthogonal to the article vertical direction Z1 is determined based on a result of detection by the reference detection control.

As described above, in the present embodiment, the reference position S is set at the gravity center position S1. Accordingly, if the reference holding position S2 of the target article WT is set at the gravity center position S1, the actual holding position (center position R) by the holding portion 31 and the reference position S ideally coincide. Therefore, in this case, the difference between the actual holding position by the holding portion 31 and the reference position S corresponds to the amount of displacement between the actual holding position by the holding portion 31 and the reference holding position S2. If the reference holding position S2 of the target article WT is set at a suckable position other than the gravity center position S1, the positional relationship between the holding position by the holding portion 31 and the reference position S ideally match the positional relationship between the reference holding position S2 and the gravity center position S1. Therefore, in this case, the difference between the positional relationship between the actual holding position by the holding portion 31 and the reference position S and the positional relationship between the reference holding position S2 and the gravity center position S1 (reference position 5) corresponds to the amount of displacement between the actual holding position by the holding portion 31 and the reference holding position S2. In either case, the amount of displacement between the actual holding position by the holding portion 31 and the reference holding position S2 can be substantially determined by determining the positional relationship between the holding portion 31 and the reference position S.

The position calculation control is a control to calculate, based on the positional relationship determined by the determination control, a movement destination position P4 that is a position, of the holding portion 31 at the movement destination P2, at which the outer edge of the target article WT held by the holding portion 31 fits within the movement region G. In the present embodiment, in the position calculation control, the movement destination position P4 is changed in a direction orthogonal to the container vertical direction Z2, based on the positional relationship determined by the determination control, such that the reference holding position S2 is located at the center of the movement region G, according to the amount of displacement of the actual holding position (center position R) by the holding portion 31 relative to the reference holding position S2. The changing direction and the changing amount of the movement destination position P4 in this case correspond to the direction in which the actual holding position by the holding portion 31 is displaced relative to the reference holding position S2 and the amount of displacement. Note that, if there is no displacement between the actual holding position by the holding portion 31 and the reference holding position S2, the movement destination position P4 will be located at the center of the movement region G. Note that, in the present embodiment, the center of the movement region G is the gravity center position of the figure that forms the movement region G.

Figure 12:
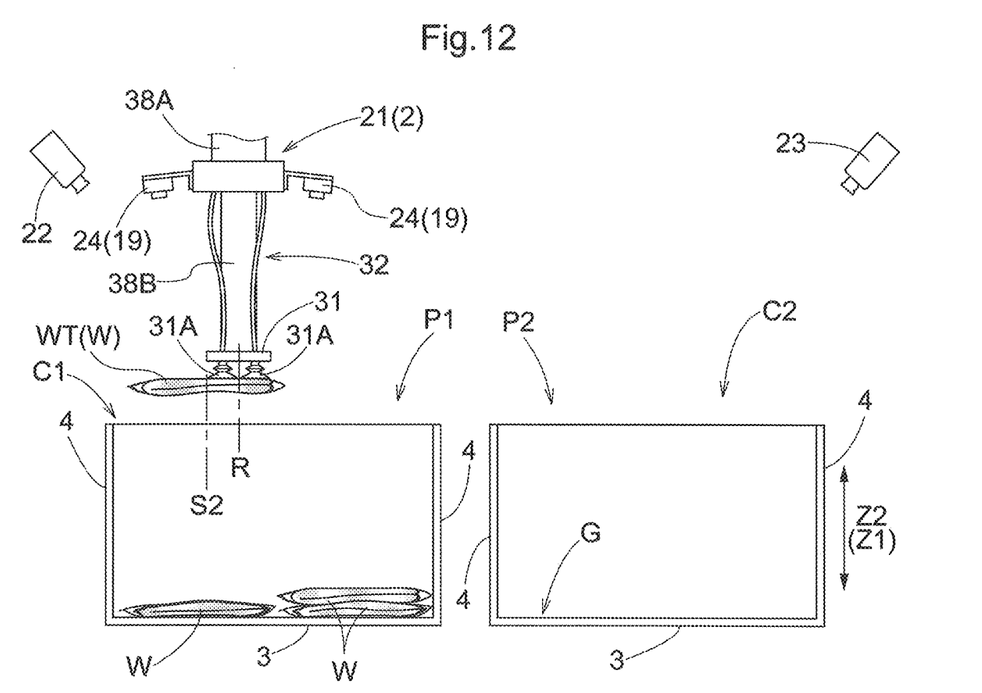
FIG. 12 is a side view showing a state in which the first movement control has been performed.
Figure 13:
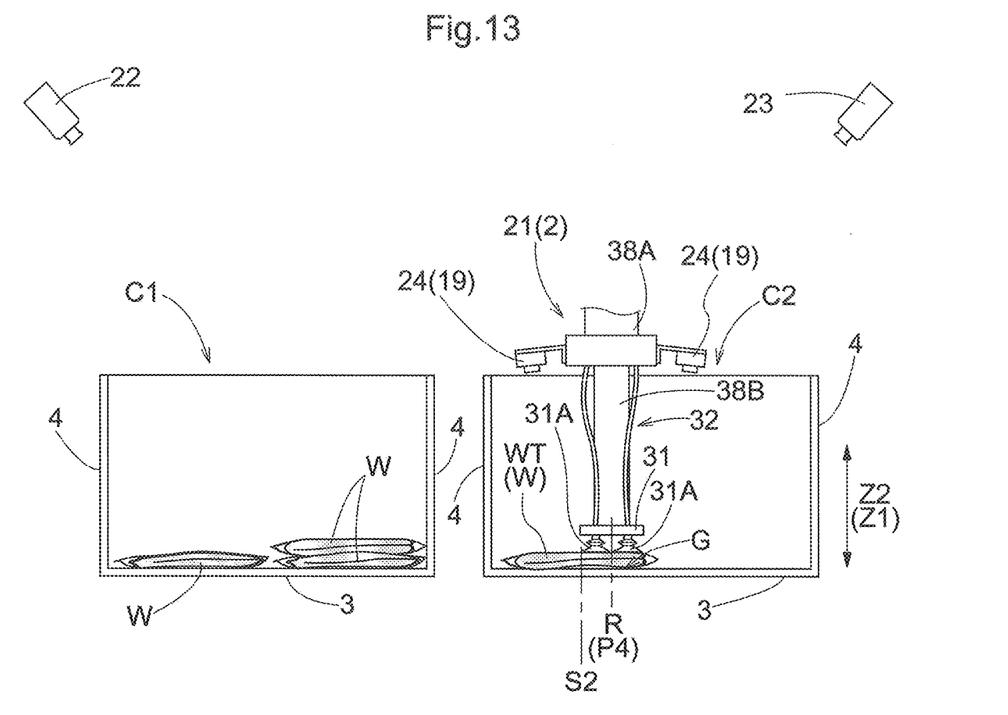
FIG. 13 is a side view showing a state in which the second movement control has been performed.

In the example shown in FIGS. 12 to 14, the actual holding position (center position R) by the holding portion 31 is displaced to the lower right in the drawings relative to the reference position S, and the amount of displacement is represented as (x1, y1) in an XY coordinate system with respect to the second container C2, as shown in FIG. 14. In this case, in the position calculation control, the control unit 26 calculates, as the movement destination position P4, a position that is displaced by (x1, y1) in a direction orthogonal to the container vertical direction Z2 relative to the position at the center of the movement region G (gravity center). Thus, as shown in FIG. 14, the movement destination position P4 of the holding portion 31 has been changed to the lower right position in the drawing relative to the position shown in FIG. 11. Thus, the outer edge of the target article WT can fit within the movement region G in a state in which the target article WT held by the holding portion 31 has been moved to the movement destination P2.

The hold-release control is a control to release the hold of the target article WT located inside the movement region G. When the hold-release control is performed, the holding portion 31 is located at the movement destination position P4 as shown in FIGS. 10 and 13, and the target article WT is located such that the outer edge thereof fits within the movement region G as shown in FIGS. 11 and 14. By performing the hold-release control in such a state, the target article WT is housed inside the movement region G of the second container C2.

The confirmation control is a control to capture an image of the inside of the second container C2 of the movement destination P2 by the second image capturing device 23 after the hold-release control has been performed, and confirm that the target article WT is housed inside the movement region G based on the image capture information.

Figure 6:
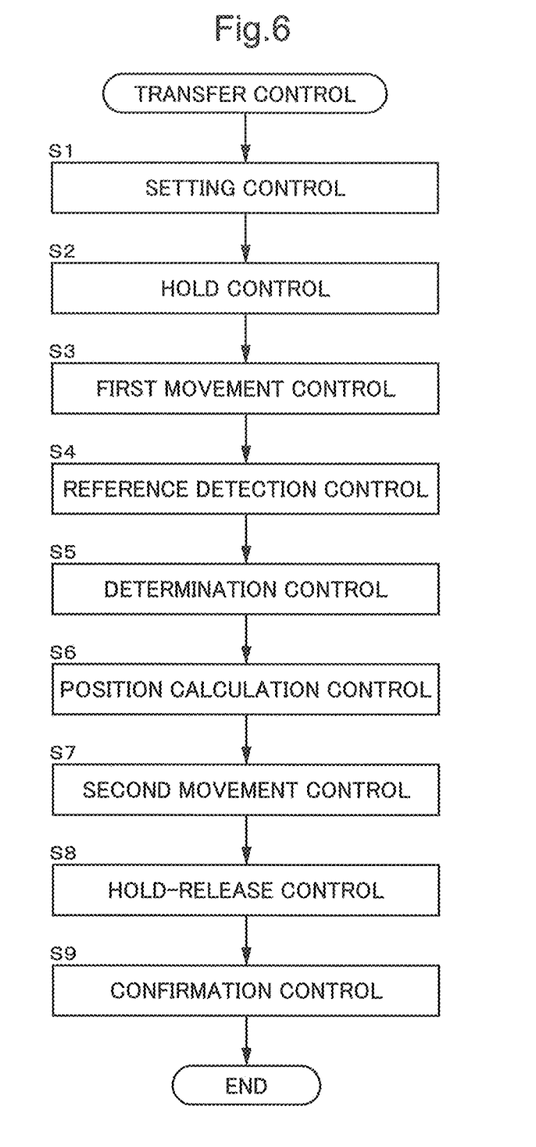
FIG. 6 is a flowchart of transfer control.

Next, the transfer control will be described with reference to the flowchart shown in FIG. 6. The control device H performs the setting control to set a target article WT from among the articles W housed in the first container C1 located at the movement origin P1, and to set the reference holding position S2 for the target article WT (S1). Next, the control device H performs the hold control to hold the target article WT such that the center position R of the suction pad 31A is located at the reference holding position S2 as viewed in the container vertical direction (S2). Thereafter, the control device H performs the first movement control to move the target article WT to the detection position P3 (S3). Then, in a state in which the target article WT is located at the detection position P3, the control device H performs the reference detection control to detect the reference position S of the target article WT (S4), and performs the determination control to determine the positional relationship between the holding portion 31 and the reference position S (S5). Next, the control device H performs the position calculation control based on the positional relationship between the holding portion 31 and the reference position S, to calculate an appropriate movement destination position P4 of the holding portion 31 (S6). Then, the control device H performs the second movement control to move the holding portion 31 such that the outer edge of the target article WT fits within the movement region G (S7), and thereafter performs the hold-release control to release the hold of the target article WT by the holding portion 31 (S8). Thereafter, the control device H performs the confirmation control to confirm that the target article WT has been moved to the movement region G (S9).

2. Other Embodiments

Next, other embodiments of the article transfer apparatus will be described.

Figure 15:
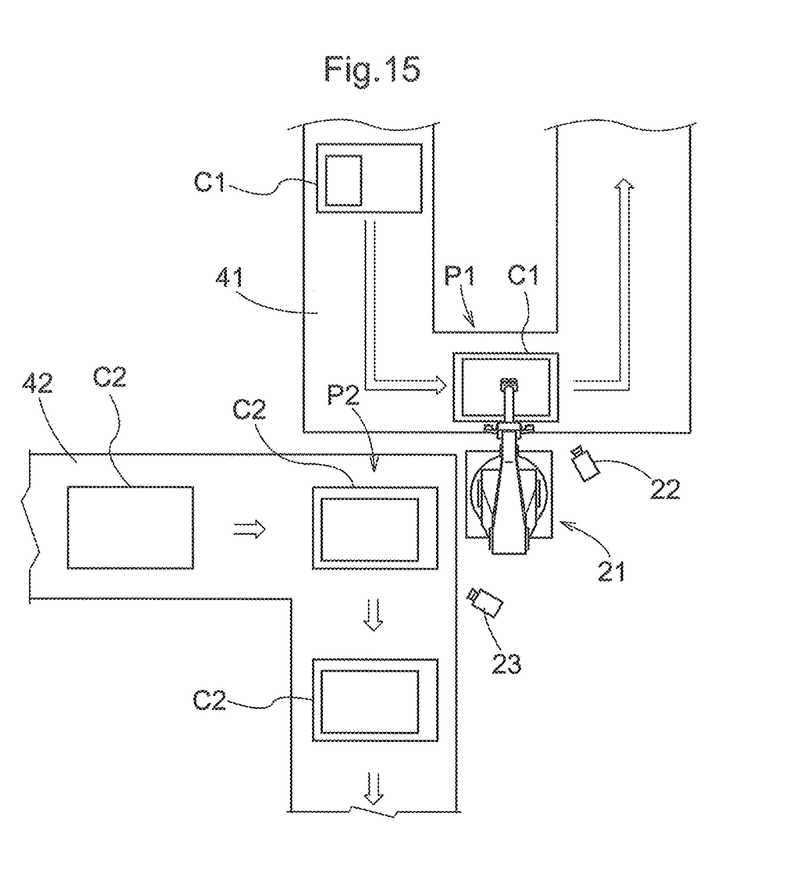
FIG. 15 is a plan view showing a container transport apparatus described in (1) in Other Embodiments.

(1) The above embodiment has described, as an example, a configuration in which a carousel-type transport apparatus is provided as the container transport apparatus 1, the movement origin P1 is set at a position midway in the rotation-transport path of the first transport portion 5, and the movement destination P2 is set at a position midway in the rotation-transport path of the second transport portion 6. However, the present disclosure is not limited to such a configuration. For example, as shown in FIG. 15, it is possible to adopt a configuration in which a first conveyor 41 and a second conveyor 42 are provided as the container transport apparatus 1, the movement origin P1 is set at a position midway in the transport path of the first conveyor 41, and the movement destination P2 is set at a position midway in the transport path of the second conveyor 42.

(2) The above embodiment has described, as an example, a configuration in which a position serving as the gravity center of a plane figure surrounded by the outer edge of the target article WT as viewed in the article vertical direction is set as the gravity center position S1. However, the present disclosure is not limited to such a configuration. For example, it is possible to adopt a configuration in which the gravity center position S1 is set based on gravity center position information stored in the control unit 26 that indicates the position of the gravity center of an article W. In this case, it is preferable that the gravity center position information is information indicating the actual gravity center position of an article W according to the type of the article W.

(3) The above embodiment has described, as an example, a configuration in which the gravity center position S1 of the target article WT is set as the reference position S. However, the present disclosure is not limited thereto. The reference position S may be set at an outer edge portion of the target article WT. In this case, for example, a corner portion of a rectangular article W as viewed in the article vertical direction may be the reference position S. Alternatively, the reference position S may be set at a position that differs according to the type of the article W. In this case, for example, the reference holding position S2 for being held by the holding portion 31 may be the reference position S.

(4) The above embodiment has described an example in which the detection position P3 at which the reference detection control to detect the reference position S of the target article WT by the reference detection portion 19 is performed is set vertically upward of the first container C1 of the movement origin P1. However, the present disclosure is not limited thereto. The detection position P3 may be set at any position other than the movement origin P1 and the movement destination P2. For example, it is also preferable to set, as the detection position P3, a position at which no other article or the like is present in the background of the target article WT whose image is to be captured by the third image capturing device 24, for example, a position at which a plain flat plate is in the background of the target article WT. Such a detection position P3 is preferable, for example, when the third image capturing device 24 is a two-dimensional camera, rather than a three-dimensional camera. Note that, in order to shorten the time required to move the target article WT from the movement origin P1 to the movement destination P2, it is preferable that the detection position P3 is set in the movement path of the target article WT that extends from the movement origin P1 to the movement destination P2.

(5) The above embodiment has described, as an example, a configuration in which the third image capturing device 24 is coupled to the holding portion 31 such that the third image capturing device 24 moves together with the holding portion 31. However, the present disclosure is not limited to such a configuration. For example, it is possible to adopt a configuration in which the position of the third image capturing device 24 is set in a fixed state at a position at which an image of the target article WT located at the detection position P3 can be captured.

(6) The above embodiment has described, as an example, a configuration in which the transfer robot 21 is a vertical articulated robot. However, the present disclosure is not limited to such a configuration. For example, the transfer robot 21 may be formed by a different robot such as a horizontal articulated robot (scalar robot), an orthogonal robot, or a parallel link robot.

(7) The above embodiment has described, as an example, a configuration in which the movement region G is set on the bottom portion 3 of the box-shaped housing portion. However, the present disclosure is not limited to such a configuration. For example, it is possible to adopt a configuration in which a plate-shaped member such as a pallet is set at the movement destination P2, and the movement region G is set on the upper surface of the plate-shaped member.

(8) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

3. Outline of the Embodiment

In the following, an outline of the article transfer apparatus described above will be described.

An article transfer apparatus includes a holding portion that holds a target article; a driving portion that moves the holding portion; and a control unit that controls the holding portion and the driving portion, wherein the control unit performs hold control to hold the target article located at a movement origin, movement control to move the target article held by the holding portion into a movement region of a movement destination, and hold-release control to release hold of the target article located inside the movement region, the article transfer apparatus further includes a reference detection portion that detects a reference position of the target article held by the holding portion, the control unit further performs reference detection control to detect, by the reference detection portion, the reference position in a state in which the target article is lifted from the movement origin, determination control to determine a positional relationship between the holding portion and the reference position based on a result of detection by the reference detection control, and position calculation control to calculate, based on the positional relationship determined by the determination control, a movement destination position that is a position, of the holding portion at the movement destination, at which an outer edge of the target article held by the holding portion fits within the movement region, and the control unit controls the driving portion so as to move the holding portion to the movement destination position in the movement control.

With the present configuration, the reference position is detected by the reference detection portion in a state in which the target article is lifted from the movement origin. By detecting the reference position in a state in which the target article is lifted from the movement origin in this manner, the reference position can be detected under less influence or no influence from another article or the like located at the movement origin, as compared with when the reference position is detected in a state in which the target article is located at the movement origin. Accordingly, the accuracy of detection of the reference position of the target article can be increased, and the accuracy of determination of the positional relationship between the holding portion and the reference position, which is determined based on a result of the aforementioned detection, can also be increased.

By performing the position calculation control based on the determined positional relationship between the holding portion and the reference position, it is possible to obtain an appropriate movement destination position of the holding portion according to the positional relationship between the holding portion and the reference position in a state in which the target article is held. By moving the holding portion to a movement destination position obtained in this manner, the target article can be moved to the movement destination such that the outer edge of the target article fits within the movement region. That is, even if the positional relationship between the holding portion and the reference position is not a proper positional relationship as a result of the holding position of the target article by the holding portion being displaced from the holding position serving as a reference, it is possible to obtain an appropriate movement destination position of the holding portion according to that positional relationship. Therefore, by moving the holding portion to the obtained movement destination position, the target article can be moved such that the outer edge of the target article fits within the movement region. Thus, with the present configuration, even if the holding position of the target article by the holding portion is displaced from the holding position serving as a reference, the target article can be appropriately moved into the movement region of the movement destination.

Here, it is preferable that the article transfer apparatus further includes a gravity center detection portion that detects a gravity center position of the target article located at the movement origin, and the control unit controls the holding portion and the driving portion so as to hold the gravity center position of the target article located at the movement origin in the hold control, based on a result of detection by the gravity center detection portion, and detects the gravity center position of the target article as the reference position by the reference detection portion in the reference detection control.

With the present configuration, the holding position serving as a reference when holding the target article by the holding portion is the gravity center position of the target article. Accordingly, the stability of the holding state of the target article can be increased when moving the target article from the movement origin to the movement destination, and thus, appropriate movement of the target article to the movement destination is facilitated. Since the gravity center position of the target article is detected as the reference position, the holding position serving as a reference for holding by the holding portion and the reference position of the target article that is detected by the reference detection portion coincide. Accordingly, the control to determine the positional relationship between the holding portion and the reference position in the determination control can be simplified.

It is preferable that the reference detection portion includes a reference image capturing device that captures an image of the target article, and a determination unit that determines the reference position of the target article based on image capture information obtained by the reference image capturing device, and the reference image capturing device is coupled to the holding portion so as to move together with the holding portion.

With the present configuration, the reference image capturing device moves together with the holding portion, and therefore, an image of the target article in a state in which it is held and lifted by the holding portion can be appropriately captured by the reference image capturing device. Accordingly, it is possible to easily increase the detection accuracy when detecting the reference position of the target article based on the image capture information obtained by the reference image capturing device.

It is preferable that a box-shaped housing portion that is open upward is installed at the movement destination, and the movement region is set on a bottom portion of the box-shaped housing portion.

When the box-shaped housing portion is installed at the movement destination, it may not be possible to appropriately house the target article inside the box-shaped housing portion as a result of, for example, the target article coming into contact with a side wall portion of the box-shaped housing portion if an edge portion of the target article does not fit within the movement region. However, with the present configuration, it is possible to appropriately move the target article into the movement region of the movement destination even if the holding position of the target article by the holding portion is displaced from the holding position serving as a reference. Accordingly, the target article can be appropriately housed inside the box-shaped housing portion located at the movement destination.

The technique according to the present disclosure is applicable to an article transfer apparatus including a holding portion that holds a target article, a driving portion that moves the holding portion, and a control unit that controls the holding portion and the driving portion.

What is claimed is:

1. An article transfer apparatus comprising:
a holding portion comprising at least one suction pad that holds a target article;
a robotic arm that moves the holding portion; and
a controller that controls the holding portion and the robotic arm, wherein:
the controller performs hold control to hold the target article located at a movement origin, movement control to move the target article held by the holding portion into a movement region of a movement destination, and hold-release control to release hold of the target article located inside the movement region,
the article transfer apparatus further comprises a reference detection portion that detects a reference position of the target article held by the holding portion, and
the controller controls the holding portion and the robotic arm so as to hold a reference holding position set based on a type of the target article in the hold control,
wherein the controller further performs:
reference detection control to detect, by the reference detection portion, the reference position in a state in which the target article is lifted from the movement origin,
determination control to determine a positional relationship between the holding portion and the reference position based on a result of detection by the reference detection control, and
position calculation control to calculate, based on the positional relationship determined by the determination control and a positional relationship between the reference holding position and the reference position, a movement destination position that is a position, of the holding portion at the movement destination, at which an outer edge of the target article held by the holding portion fits within the movement region, and
wherein the controller controls the robotic arm so as to move the holding portion to the movement destination position in the movement control.

2. The article transfer apparatus according to claim 1, further comprising:
a gravity center detection portion that detects a gravity center position, as the reference holding position, of the target article located at the movement origin, and
wherein the controller:
controls the holding portion and the robotic arm so as to hold the gravity center position of the target article located at the movement origin in the hold control, based on a result of detection by the gravity center detection portion, and
detects the gravity center position of the target article as the reference position by the reference detection portion in the reference detection control.

3. The article transfer apparatus according to claim 1, wherein the reference detection portion includes at least one reference image capturing device that captures an image of the target article, and includes a determination unit that determines the reference position of the target article based on image capture information obtained by the reference image capturing device, and
wherein the reference image capturing device is coupled to the holding portion so as to move together with the holding portion.

4. The article transfer apparatus according to claim 1, wherein a box-shaped housing portion that is open upward is installed at the movement destination, and the movement region is set on a bottom portion of the box-shaped housing portion.

5. The article transfer apparatus according to claim 3, wherein
the robotic arm includes an arm having a distal end portion to which the holding portion is coupled, and
the at least one reference image capturing device includes two reference image capturing devices which are on either side of the arm so that the arm is positioned between the two reference image capturing devices.

* * * * *